United States Patent
Wu et al.

(10) Patent No.: US 11,134,302 B2
(45) Date of Patent: Sep. 28, 2021

(54) METHOD AND APPARATUS FOR RE-USING BLACK BORDER REGIONS OF A DIGITAL TV SCREEN

(71) Applicant: InterDigital CE Patent Holdings, SAS, Paris (FR)

(72) Inventors: Qiangsheng Wu, Beijing (CN); Yong Yang, Beijing (CN); Kaijun Pei, Beijing (CN)

(73) Assignee: INTERDIGITAL MADISON PATENT HOLDINGS, SAS, Paris (FR)

( * ) Notice: Subject to any disclaimer, the term of this patent is extended or adjusted under 35 U.S.C. 154(b) by 0 days.

(21) Appl. No.: 16/489,205

(22) PCT Filed: Feb. 27, 2017

(86) PCT No.: PCT/CN2017/074972
§ 371 (c)(1),
(2) Date: Aug. 27, 2019

(87) PCT Pub. No.: WO2018/152826
PCT Pub. Date: Aug. 30, 2018

(65) Prior Publication Data
US 2020/0007924 A1  Jan. 2, 2020

(51) Int. Cl.
*H04N 5/445* (2011.01)
*H04N 21/431* (2011.01)
(Continued)

(52) U.S. Cl.
CPC ... *H04N 21/4316* (2013.01); *H04N 21/44008* (2013.01); *H04N 21/812* (2013.01); *H04N 21/8126* (2013.01); *H04N 21/8133* (2013.01)

(58) Field of Classification Search
CPC ......... H04N 21/44008; H04N 5/44513; H04N 5/44591; H04N 5/44504; H04N 5/272;
(Continued)

(56) References Cited

U.S. PATENT DOCUMENTS 7,911,536 B2 * 3/2011 Dunton .............. H04N 5/44513
348/445
8,576,338 B2 11/2013 Dehaan et al.
(Continued)

FOREIGN PATENT DOCUMENTS

CN 102404642 A 4/2012
CN 102497585 6/2012
(Continued)

OTHER PUBLICATIONS

Liu et al., "Lower Attentive Regioni Detection for Virtual Content Insertion in Broadcast Video", 2008 IEEE International Conference on Multimedia and Expo (ICME), Hannover, Germany, Jun. 23, 2008, pp. 1529-1532.
(Continued)

*Primary Examiner* — Sherrie Hsia
(74) *Attorney, Agent, or Firm* — Invention Mine LLC

(57) ABSTRACT

A method and apparatus are described including detecting, if any, black border regions surround a received frame of video program content and determining a size of the detected black border regions and if the sum of the determined size of the top and bottom black border regions surrounding the received frame of video program content is greater than a value, copying to a frame buffer, a video decoder buffer having a decoded frame of video program content stored therein and copying a secondary insertion decoder buffer to the frame buffer.

27 Claims, 11 Drawing Sheets

(51) Int. Cl.
*H04N 21/44* (2011.01)
*H04N 21/81* (2011.01)

(58) Field of Classification Search
CPC ........ H04N 5/265; H04N 5/275; H04N 5/278; H04N 7/0122; H04N 7/0125; H04N 7/0105; H04N 21/4316; H04N 21/812; H04N 21/8126; H04N 21/8133; H04N 9/74
USPC ....... 348/563–565, 568, 556, 558, 913, 704, 348/442, 445, 585, 589, 600; 725/42
See application file for complete search history.

(56) References Cited

U.S. PATENT DOCUMENTS

| | | | |
|---|---|---|---|
| 8,749,710 | B2 | 6/2014 | Bryan et al. |
| 9,237,258 | B2 | 1/2016 | Zalewski |
| 2001/0043285 | A1 | 11/2001 | Hicks |
| 2004/0107439 | A1 | 6/2004 | Hassell |
| 2004/0194123 | A1 | 9/2004 | Fredlund |
| 2006/0059514 | A1 | 3/2006 | Hsiao et al. |
| 2008/0007655 | A1 | 1/2008 | Fujisawa |
| 2011/0109797 | A1* | 5/2011 | Dunton .............. H04N 21/4312 348/468 |
| 2011/0206352 | A1 | 8/2011 | Mikawa |
| 2013/0176486 | A1* | 7/2013 | Ziemski .................. H04N 7/01 348/441 |
| 2015/0078733 | A1 | 3/2015 | Popkiewicz et al. |
| 2016/0261923 | A1 | 9/2016 | Huang et al. |

FOREIGN PATENT DOCUMENTS

| | | | |
|---|---|---|---|
| CN | 102497585 | A | 6/2012 |
| CN | 103024313 | A | 4/2013 |
| CN | 103024315 | A | 4/2013 |
| CN | 103546713 | A | 1/2014 |
| CN | 103546715 | A | 1/2014 |
| CN | 105450908 | | 3/2016 |
| EP | 2173090 | B1 | 11/2014 |
| JP | 2002536923 | | 10/2002 |
| JP | 101562712 | A | 10/2009 |
| JP | 2011113512 | A | 6/2011 |
| WO | 0046988 | A2 | 8/2000 |
| WO | 0046988 | A3 | 12/2000 |

OTHER PUBLICATIONS

Hegde et al., "Contour-Traversal Based Algorithm for Insertion of Virtual Advertisements in Videos", 2012 International Conference on Communication, Information & Computing Technology (ICCICT 2012), Mumbai, India, Oct. 19, 2012, 5 pages.

Nudd, T., "JWT Turns the Black Bars on Vertical YouTube Videos Into Ad Space for Nonprofits", https://www.adweek.com/creativity/jwt-turns-black-bars-vertical-youtube-videos-ad-space-nonprofits-167398/, Oct. 6, 2015, 2 pages.

Wikipedia, "YUV". Wikipedia web article, modified on Feb. 4, 2017, available at: https://en.wikipedia.org/w/index.php?title=YUV&oldid=763683985, 10 pages.

Wikipedia, "YCbCr". Wikipedia web article, modified on Feb. 9, 2017, available at: https://en.wikipedia.org/w/ndex.php?title=YCbCr&oldid=764515801, 5 pages.

International Search Report and Written Opinion of the International Searching Authority for PCT/CN2017/074972 dated Sep. 30, 2017, 11 pages.

International Preliminary Report on Patentability for PCT/CN2017/074972 dated Aug. 27, 2019, 4 pages.

* cited by examiner

```
┌─────────────────────────────────────────────┐
│ DETECTING, IF ANY, BLACK BORDER REGIONS AT  │
│   LEAST PARTIALLY SURROUNDING A RECEIVED    │
│       FRAME OF VIDEO PROGRAM CONTENT        │
│                    1602                     │
└─────────────────────────────────────────────┘
                      │
                      ▼
┌─────────────────────────────────────────────┐
│  DETERMINING A SIZE OF EACH SAID DETECTED   │
│            BLACK BORDER REGION              │
│                    1604                     │
└─────────────────────────────────────────────┘
                      │
                      ▼
┌─────────────────────────────────────────────┐
│   IF A SUM OF THE DETERMINED SIZE OF TWO    │
│    OPPOSING BLACK BORDER REGIONS AT LEAST   │
│   PARTIALLY SURROUNDING SAID RECEIVED FRAME │
│   OF VIDEO PROGRAM CONTENT IS GREATER THAN  │
│   A VALUE, ADJUSTING THE TWO OPPOSING BLACK │
│    BORDER REGIONS TO CREATE A LARGER BLACK  │
│    BORDER REGION AND INSERTING SECONDARY    │
│   INFORMATION INTO THE LARGER BLACK BORDER  │
│                    REGION                   │
│                                             │
│   WHEREIN ADJUSTING THE TWO OPPOSING BLACK  │
│    BORDER REGIONS TO CREATE A LARGER BLACK  │
│    BORDER REGION AND INSERTING SECONDARY    │
│   INFORMATION INTO THE LARGER BLACK BORDER  │
│                REGION INCLUDES:             │
│                                             │
│  • COPYING TO A FRAME BUFFER, A VIDEO       │
│    DECODER BUFFER HAVING A DECODED FRAME    │
│    OF VIDEO PROGRAM CONTENT STORED          │
│    THEREIN                                  │
│                                             │
│  • COPYING A SECONDARY INSERTION DECODER    │
│    BUFFER HAVING THE SECONDARY              │
│    INFORMATION TO SAID FRAME BUFFER         │
│                                             │
│                    1606                     │
└─────────────────────────────────────────────┘
```

METHOD AND APPARATUS FOR RE-USING BLACK BORDER REGIONS OF A DIGITAL TV SCREEN

This application claims the benefit, under 35 U.S.C. § 365 of International Application PCT/CN2017/074972, filed Feb. 27, 2017, which was published in accordance with PCT Article 21(2) on Aug. 30, 2018, in English.

FIELD

The proposed method and apparatus is directed to detecting black border regions of a digital TV screen and adjusting those regions for re-use.

BACKGROUND

This section is intended to introduce the reader to various aspects of art, which may be related to the present embodiments that are described below. This discussion is believed to be helpful in providing the reader with background information to facilitate a better understanding of the various aspects of the present disclosure. Accordingly, it should be understood that these statements are to be read in this light.

CN103024313A describes a method for adjusting a television picture size in real time according to video content. CN103546713A describes a method and device for adjusting the proportion of a picture of a smart television. CN101562712A describes a method for realizing interception playing of a digital TV network video self-adaptive window. CN102497585A describes an advertising method for television equipment and the television equipment. U.S. Pat. No. 8,749,710 describes a simple, cost-effective, and robust method and system to obstruct crawls, logos, and other annoying and distracting images overlaid on a video signal and displayed on a TV set or monitor is provided. The method and system may detect the presence of the unwanted images and block them automatically, or they may accept manual input from the user via a handheld control device to block or obstruct these images.

Normally the top and bottom of a TV screen are geometrically symmetrical. That is, the top and bottom black border regions of a TV screen are almost same height. Separately, neither the top or bottom alone are large enough to be recycled and reused for value added information display, such as ads, notification and weather forecast, etc. The proposed method is advantageous to both users (consumers, subscribers) and the advertisers. For the user (consumer) the TV program may be rendered with no commercial interruptions because advertisements are displayed (rendered) at the bottom (top, left and/or right) concurrently with the current video content (current video input). For advertisers, advertisements can be run constantly so there is more advertisement time. This also means that the video content provider (cable, satellite, broadcast) can sell more advertising time for additional revenue.

None of the art that Applicants are aware of describes shifting the active video area. Instead, the conventional art detects suitable areas, for example, black bar or some insignificant area in the active video area, for inserting and displaying ads.

SUMMARY

The proposed method and apparatus adjusts the display portion/height of black border at the top and bottom of TV screens. Adjusting the black borders to create a single larger black border permits information, advertisements (ads), weather forecasts, emergency and other alerts to be unobtrusively displayed in a single enlarged black border region. It is believed that displaying such information on the bottom of the screen would be less obtrusive to the human visual system. However, it is equally possible to adjust the black borders such that the larger black border is at the top of the screen. The proposed method will be described assuming that the larger black border is created at the bottom of the TV screen. Similarly, it is also possible to create larger left or right black border in addition to the larger bottom black border using a similar procedure. Creation of a larger left or right black border can be instead of or in addition to the creation of the larger bottom black border. It is known in the art that video content (input) is made up of a series of frames that are decoded by the digital TV receiving the video content from a content provider (cable, satellite, broadcast, IPTV). Typically, a digital TV has both audio and video decoders for decoding the content provided by the content provider. It is envisioned that the proposed method may be implemented in either the digital TV or in another receiving device such as a media device, a home gateway device, a set top box, a router, bridge or brouter.

A method and apparatus are described including detecting, if any, black border regions surround a received frame of video program content and determining a size of the detected black border regions and if the sum of the determined size of the top and bottom black border regions surrounding the received frame of video program content is greater than a value, copying to a frame buffer, a video decoder buffer having a decoded frame of video program content stored therein and copying a secondary insertion decoder buffer to the frame buffer.

BRIEF DESCRIPTION OF THE DRAWINGS

The proposed method and apparatus is best understood from the following detailed description when read in conjunction with the accompanying drawings. The drawings include the following figures briefly described below:

FIG. 16 is a flowchart illustrating an example process for handling a black border region according to some embodiments.

Figure 1:
FIG. 1 shows a TV program on a conventional digital TV.

It should be understood that the drawing(s) are for purposes of illustrating the concepts of the disclosure and is not necessarily the only possible configuration for illustrating the disclosure.

DETAILED DESCRIPTION

The present description illustrates the principles of the present disclosure. It will thus be appreciated that those skilled in the art will be able to devise various arrangements that, although not explicitly described or shown herein, embody the principles of the disclosure and are included within its scope.

All examples and conditional language recited herein are intended for educational purposes to aid the reader in understanding the principles of the disclosure and the concepts contributed by the inventor to furthering the art, and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein represent conceptual views of illustrative circuitry embodying the principles of the disclosure. Similarly, it will be appreciated that any flow charts, flow diagrams, state transition diagrams, pseudocode, and the like represent various processes which may be substantially represented in computer readable media and so executed by a computer or processor, whether or not such computer or processor is explicitly shown.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, read only memory (ROM) for storing software, random access memory (RAM), and nonvolatile storage.

Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

In the claims hereof, any element expressed as a means for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The disclosure as defined by such claims resides in the fact that the functionalities provided by the various recited means are combined and brought together in the manner which the claims call for. It is thus regarded that any means that can provide those functionalities are equivalent to those shown herein.

FIG. 1 shows a TV program on a conventional digital TV. As can be seen, the video content (TV program) has black borders on the top, bottom, right and left sides surrounding the picture (active video area displaying video content).

Figure 2:
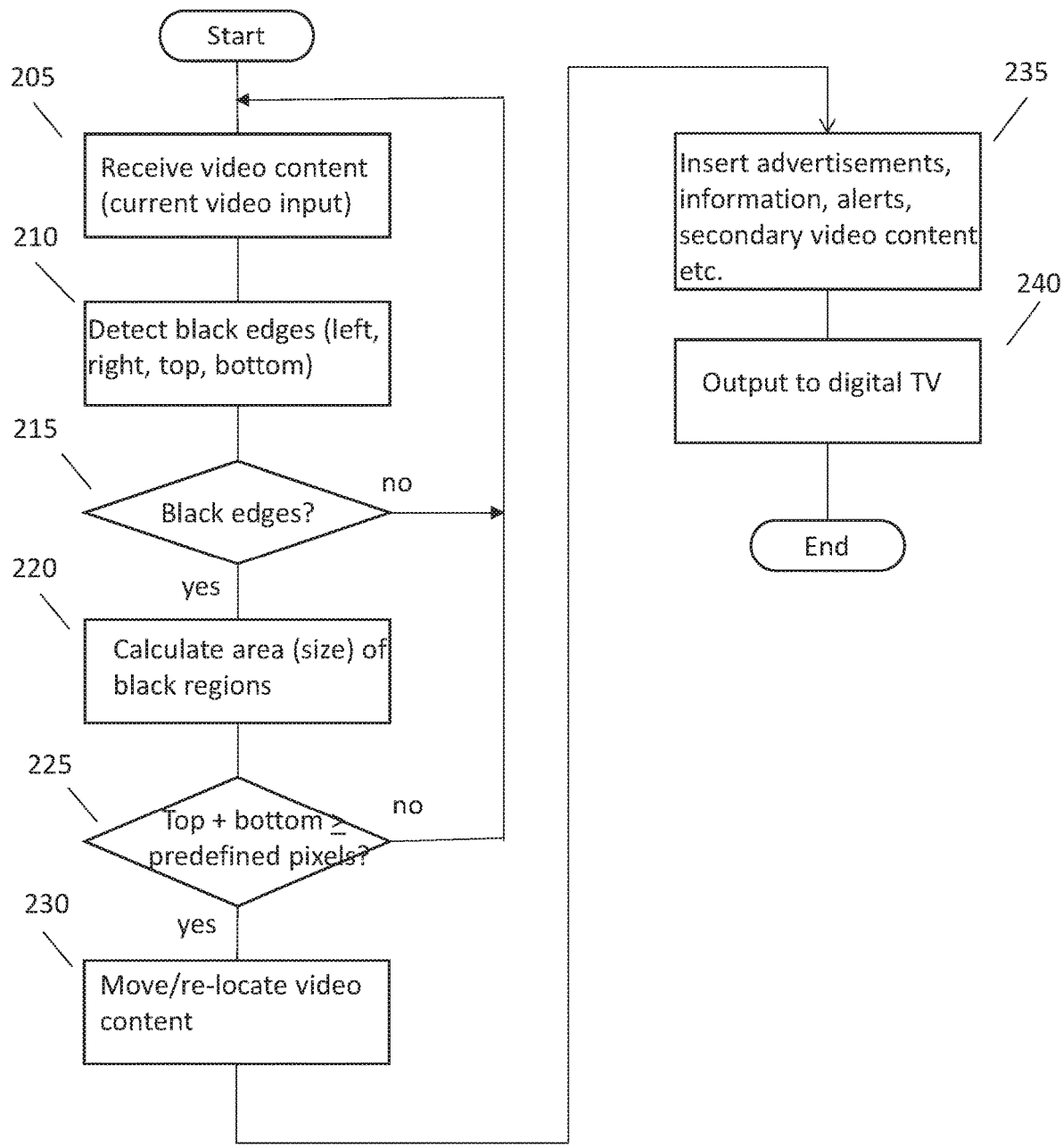
FIG. 2 is a flowchart of an exemplary embodiment of the proposed method for identifying and using the black border areas surrounding the video content displayed on a digital TV.

FIG. 2 is a flowchart of an exemplary embodiment of the proposed method for identifying and using the black border regions surrounding the video content displayed on a digital TV screen. The proposed method is described in terms of the top and bottom black border regions on a digital TV screen, however, it should be noted that the left and right black border regions on a digital TV screen could be used in addition to or instead of the top and bottom black border regions of the digital TV screen. At 205 the digital TV receives video content (current video input). At 210 the digital TV detects the edges (top, bottom, left and right) of the black border regions of the TV screen. At 215 a test is performed to determine if any black border edges were detected. If no black edges were detect then processing proceeds to 205. If black border edges were detected then at 220 the area (size) of the black border regions are calculated. At 225 at test is performed to determine if the sum of the top and bottom areas of the black border regions is greater than or equal to a predefined number of pixels. The predefined number of pixels is the luminance threshold. If the sum of the areas of the top and bottom black border regions is not greater than or equal to a predefined number of pixels then processing proceeds to 205. If the sum of the areas of the top and bottom black border regions is greater than or equal to a predefined number of pixels then at 230 the video content is moved (re-located, lifted-up/down) up by an amount equal to the amount of the top black border region area. The moving (re-location, lifted-up/down) of the current video content (current video input) is accomplished by copying the video decoding buffer to a frame buffer. This adds an extra vertical direction offset. The entire valid display area height (altitude) is raised up (higher). While the proposed method is described in terms of the video being moved up, the video may be moved down as well, by moving the black border regions up. Thus, there will be an enlarged bottom black border region at the bottom of the digital TV screen that can be reserved for use in displaying (rendering) advertisements, information, alerts, additional secondary video content etc. The test at 225 may be the sum of the areas of the left and right black border regions in addition to or instead of the sum of the areas of the top and bottom black border regions. At 235 the digital TV the advertisements, secondary video content, information and/or alerts etc. are inserted into the black border region now at the bottom of the digital TV screen. The insertion of the advertisements, secondary video content, information, alerts etc. is accomplished by copying the advertisements, information, secondary video content, alerts etc. from a secondary insertion decoding buffer to the frame buffer. As indicated above the left/right black border regions could be used instead of or in addition to the top and bottom black border regions. The re-located video content and advertisement, secondary video content, information, alerts etc. are then output (displayed, rendered) to the digital TV screen. It should be noted that advertisers may have to be more creative since, while it is possible to have audio for the advertisements, it would probably cause an issue if audio was being played for the current video content (input) as well as a number of advertisements. Advertisements may have to use the equivalent of closed captioning in their advertisements.

The movement (re-location) of the frame of video content may be accomplished by cutting the black borders of the frame of video content. The size of a video window is set according to the size of the effective video region (frame size less size of black border regions). The frame of video content in the video decoding buffer is moved up and copied to the frame buffer. Advertisements or any other secondary information (alerts, secondary video content, weather etc.) is then copied from the secondary insertion decoding buffer to the frame buffer. Most digital TV (DTV) vendors provide PIP APIs. These APIs can be employed to implement insertion of advertisements or other secondary information (alerts, secondary content, weather, etc.) into everywhere which has been identified as a black border region. Thus, new hardware modules may not be required to implement the proposed method.

Figure 3:
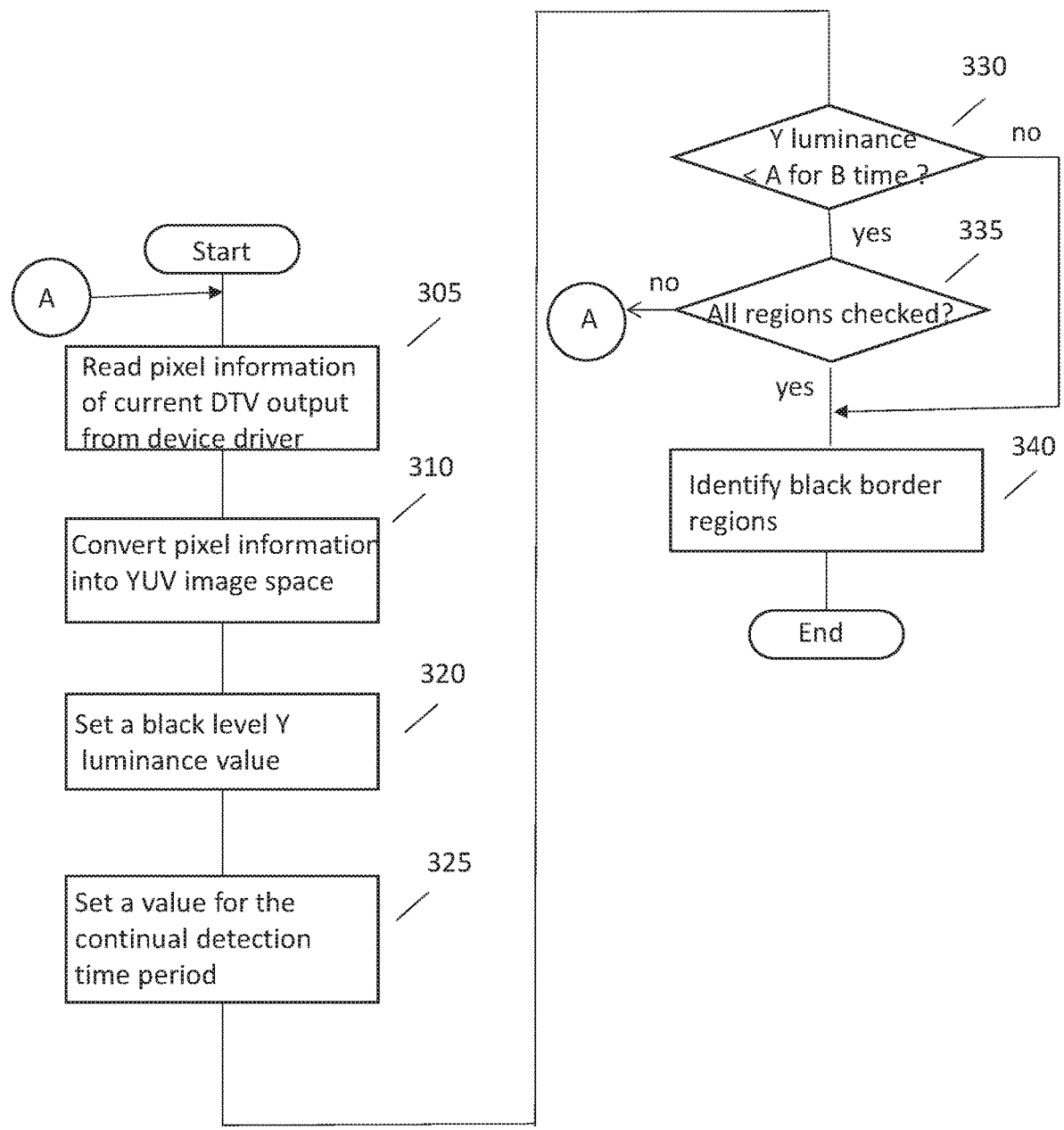
FIG. 3 is a flowchart of an exemplary embodiment of the calculate block (220) of the proposed method for identifying and using the black border areas surrounding the video content displayed on a digital TV.

FIG. 3 is a flowchart of an exemplary embodiment of the calculate block (220) of the proposed method for identifying and using the black border region surrounding the video content displayed on a digital TV screen. At 305 the pixel information of the current DTV output is read (obtained, extracted) from the display driver. At 310 the pixel information is converted into the YUV color image space by means known in the art and described in detail at http://en.wikipedia.org/wiki/YUV and https:en.wikipedia.org/wiki/YCbCr. All calculations (after conversion of the pixel information) are performed in the YUV image space. Assume the minimal Y luminance value to 0 and assume and set the Y luminance value to 100. At 320 set a black level Y luminance value (for example, to 5) and at 325 set a value for the continual detection time period (for example, 30 seconds). At 330 determine if the Y luminance value of a region is less than the black level Y luminance value (A) for about the continual detection time period (B). If the Y luminance value of a region in the YUV image space is less than the black level Y luminance value for about the continual detection time period (B), then the region is a black region. At 335 a determination is made if all regions (top, bottom, left and right) have been checked to determine if the regions are black. If all regions (top, bottom, left and right) have been checked then identify the black border regions at 340. If the Y luminance value of a region is greater than or equal to black level luminance value (A) for about the continual detection time period (B), then proceed to 340. That is, at 340 a determination is made as to whether the current video image (current video content, current video input) has a black border region that is sufficiently large to use for insertion of advertisements, secondary video content, information, alerts etc. If at 335 not all regions (top, bottom, left and right) have been checked then proceed to 305. The purpose of checking all of the regions is to ensure the black border is relevant, stable and accurate. It is possible that the program being rendered has a dark background. If the checking occurs over a period of time, then it can be determined if the region is a black region or just content with a dark background since content with dark background will change over time. If the region is content with dark background then it is not a real black border region.

Figure 4:
FIG. 4 shows the results of the detection block (210) of an exemplary embodiment of the proposed method for identifying and using the black border areas surrounding the video content displayed on a digital TV.

FIG. 4 shows the results of the detection block (210) of an exemplary embodiment of the proposed method for identifying and using the black border regions surrounding the video content displayed on a digital TV screen.

Figure 5:
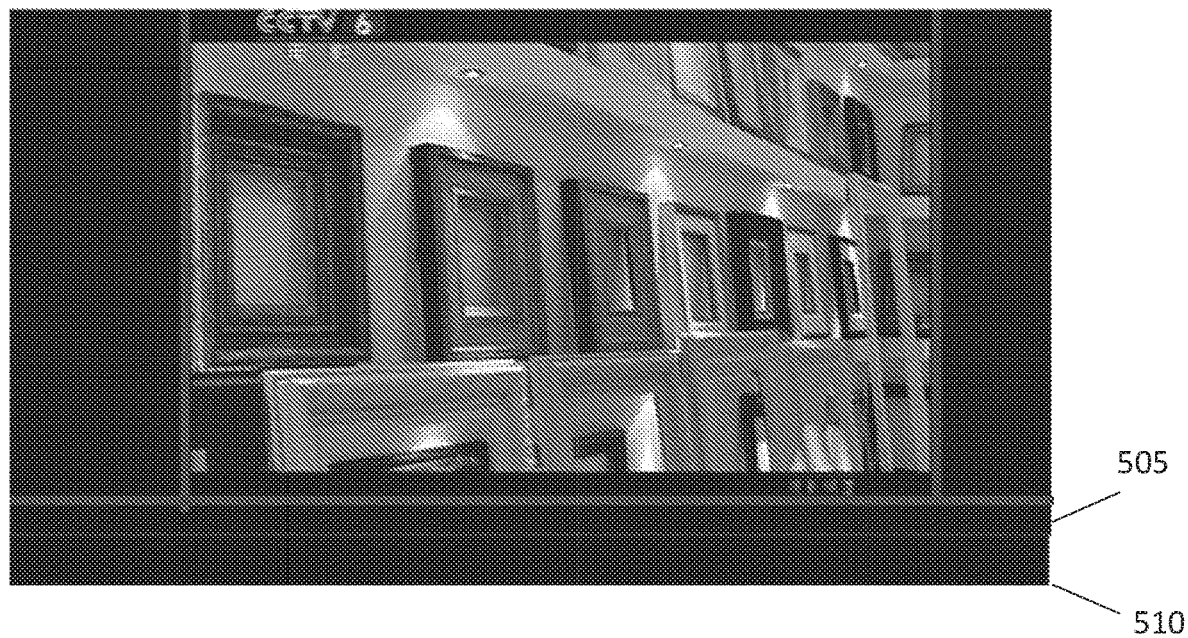
FIG. 5 shows the results of the calculate block (220) of an exemplary embodiment of the proposed method for identifying and using the black border areas surrounding the video content displayed on a digital TV.

FIG. 5 shows the results of the calculate block (220) of an exemplary embodiment of the proposed method for identifying and using the black border regions surrounding the video content displayed on a digital TV screen. The calculate block is further shown in FIG. 3 and described above. The bottom black border region 505 remains immediately below the current video input (current video content) displayed (rendered, output) to the digital TV screen and the top black border region 510 is added (moved, re-located) to the bottom black border region 505 to make a larger black border on the digital TV screen.

Figure 6:
FIG. 6 shows the results of the move/re-locate block (230) of an exemplary embodiment of the proposed method for identifying and using the black border areas surrounding the video content displayed on a digital TV.

FIG. 6 shows the results of the move/re-locate block (230) of an exemplary embodiment of the proposed method for identifying and using the black border areas surrounding the video content displayed on a digital TV screen. Once the top and bottom black border regions have been combined to form a larger black border region 605 (sum of the areas (sizes) of the top and bottom black border regions), the current video content (current video input) is moved (re-located) by lifting the current video content (current video input) up. As noted above the current video content (current video input) may be moved (re-located) downward if the enlarged black border region is created at the top of the digital TV screen. Further, an enlarged block border region may be created on the left or right side of the digital TV screen instead of or in addition to the bottom or top enlarged black border region.

Figure 7:
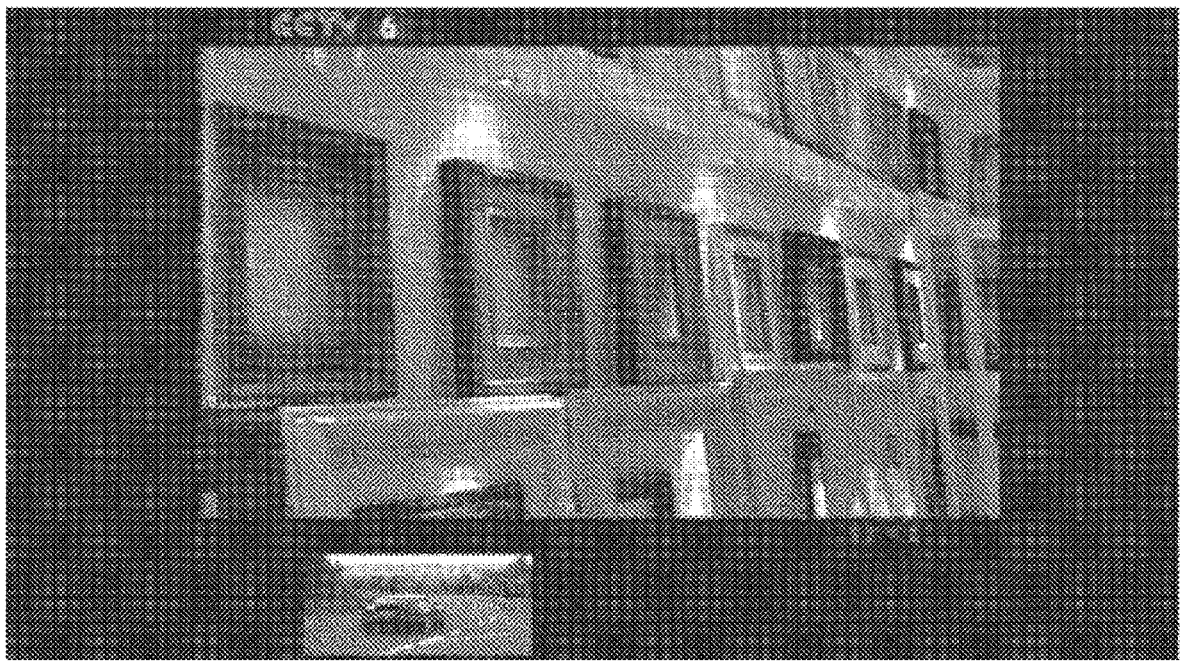
FIG. 7 shows the results of the insert block (235) of an exemplary embodiment of the proposed method for identifying and using the black border areas surrounding the video content displayed on a digital TV.

FIG. 7 shows the results of the insert block (235) of an exemplary embodiment of the proposed method for identifying and using the black border areas surrounding the video content displayed on a digital TV screen. A single advertisement has been inserted into the enlarged bottom black border region.

Figure 8:
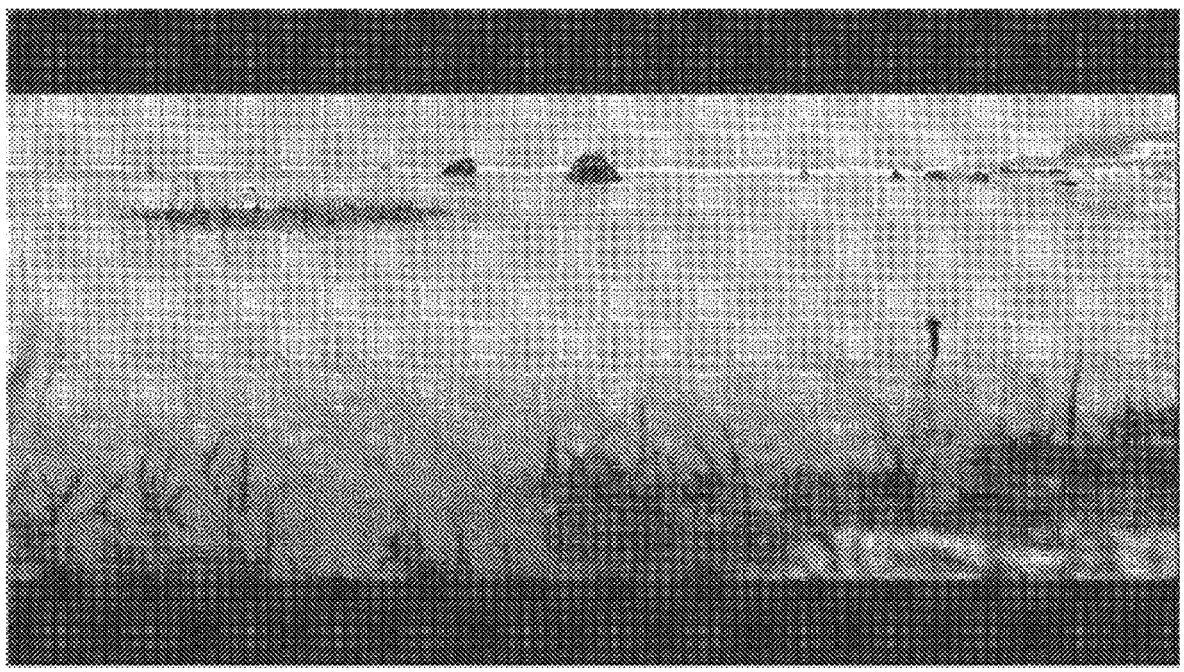
FIG. 8 shows a conventional digital TV display screen having only top and bottom black border regions.

FIG. 8 shows a conventional digital TV display screen having only top and bottom black border regions.

Figure 9:
FIG. 9 shows a digital TV screen with an advertisement inserted at a picture in picture (PIP) format.

FIG. 9 shows a digital TV screen with an advertisement inserted at a picture in picture (PIP) format. A conventional TV picture in picture (PIP) is a typical TV overlay display mode. There is a small portion of the frame of current video content (current video input) that is overlaid by another frame of video (input). This covers and blocks that portion of the digital TV display screen and interferes with the user (consumer's, subscribers) viewing experience. The proposed method and apparatus there are no picture in picture (PIP) overlays so none of the current video content (input)

will be blocked or covered up (over) so none of the current video content (input) is lost or unseen, thus, enhancing the viewing experience. It should be noted that to accomplish convention PIP, two separate tuners are required. One tuner receives the video content for main picture and the second tuner receives the video content for the overlay. IPTV does not require tuners but in the case of PIP, if both the main (primary) content and the overlay are received from an IPTV source then two IP connections are required. One receives the main (primary) video content and the second IP connection receives the video content for the overlay. While it is not typical, one of the units of content may be from IPTV and the other unit of content may be received from a cable, satellite or broadcast provider. In this instance the IPTV content would need an IP connection and a tuner would be needed for the content provided by a cable, satellite or broadcast provider.

Figure 10:
FIG. 10 shows a digital TV screen with the top and black border regions adjusted and enlarged by adding the areas of the top and bottom black border regions together in accordance with the principles of the proposed method.

FIG. 10 shows a digital TV screen with the top and black border regions adjusted and enlarged by adding the areas of the top and bottom black border regions together and re-locating the top and bottom black border regions to the bottom of the digital TV screen in accordance with the principles of the proposed method. Like FIG. 9, FIG. 10 has second video content. The difference is that the second video content is not in the form of an overlay so the second video content takes nothing away from the first (primary) video content of the main picture. As with FIG. 9, it should be noted that to accomplish the second video content displayed in the enlarged black border, two separate tuners are required. One tuner receives the video content for main (primary) picture and the second tuner receives the video content for the second video content displayed in the enlarged black border region (area). As indicated above, IPTV does not require tuners but in the case of FIG. 10, if both the main (primary) content and the second video content displayed in the enlarged black border region (area) are received from an IPTV source then two IP connections are required. One receives the main (primary) video content and the second IP connection receives the video content for the second video content displayed in the enlarged black border region (area). While it is not typical, one of the units of content may be from IPTV and the other unit of content may be received from a cable, satellite or broadcast provider. In this instance the IPTV content would need an IP connection and a tuner would be needed for the content provided by a cable, satellite or broadcast provider.

Figure 11:
FIG. 11 shows a digital TV screen with advertisements inserted into the enlarged digital TV screen at the bottom of the digital TV screen in accordance with the principles of the proposed method.

FIG. 11 shows a digital TV screen with advertisements inserted into the enlarged digital TV screen at the bottom of the digital TV screen in accordance with the principles of the proposed method.

Figure 12:
FIG. 12 shows a digital TV screen with advertisements inserted into the enlarged digital TV screen at the bottom of the digital TV screen in accordance with the principles of the proposed method.

FIG. 12 shows a digital TV screen with a "video wall" of secondary content inserted into the enlarged digital TV screen at the bottom of the digital TV screen in accordance with the principles of the proposed method. A "video wall" of secondary content may be created by inserting like programming (video content) such as a number of athletic events (e.g., a number of football games, a number of Olympic events, etc.). A video wall may also be created to monitor surveillance screens, for example from a home monitoring system that may have video feed (input) from multiple cameras at doors or entryways or children's bedrooms. Alternatively, instead of "video wall" of secondary content, a plurality of advertisements may be inserted into the enlarged black border region(s). If advertisements or surveillance screens are displayed in the enlarged black border then only a single tuner is required. However, if a "video wall" of secondary video content is displayed then a separate tuner is needed for each separate video content displayed in the enlarged black border region (area). The "video wall" of secondary video content is not in the form of an overlay so the secondary video content takes nothing away from the first (primary) video content of the main picture. As with FIG. 9, it should be noted that to accomplish the secondary video content displayed in the enlarged black border region (area), multiple separate tuners are required. One tuner receives the video content for main (primary) picture and the multiple additional tuners receive the video content for the "video wall" displayed in the enlarged black border region (area). As indicated above, IPTV does not require tuners but in the case of FIG. 12, if both the main (primary) content and the secondary video content (video wall) displayed in the enlarged black border region (area) are received from an IPTV source then multiple IP connections are required. One receives the main (primary) video content and the additional multiple IP connections receive the video content for the secondary video content (video wall) displayed in the enlarged black border region (area). While it is not typical, one or more of the units of content may be from IPTV and the other one or more units of content may be received from a cable, satellite or broadcast provider. In this instance any of the IPTV content would each need an IP connection and tuner(s) would be needed for each unit of the content provided by a cable, satellite or broadcast provider.

Figure 13:
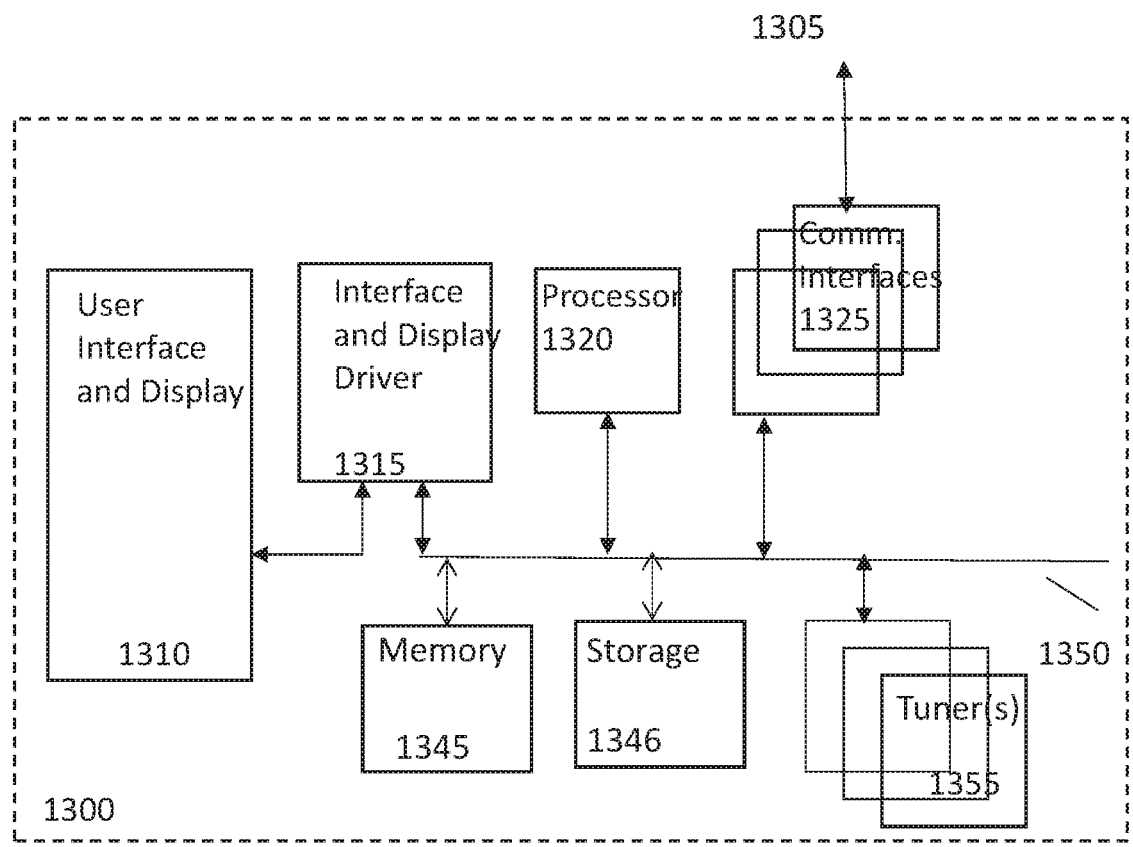
FIG. 13 is a block diagram of an exemplary receiving device (home networking device, media device) 1300 such as, but not limited to, a set top box or a digital TV.

FIG. 13 is a block diagram of an exemplary receiving device (home networking device, media device, router, bridge, brouter) 1300 such as, but not limited to, a set top box or a digital TV. The block diagram configuration includes a bus-oriented 1350 configuration interconnecting a processor 1320, and a memory 1345. The configuration of FIG. 13 also includes a communication interface 1325. The communication interface 1325 may be wired or wireless and may in fact, include two interfaces—one for wired line communication and one for wireless communication.

Processor 1320 provides computation functions for set top box, such as those depicted in FIGS. 1-12 as well as conventional set top box functionality. The processor 1320 can be any form of CPU or controller that utilizes communications between elements of the set top box to control communication and computation processes. Those of skill in the art recognize that bus 1350 provides a communication path between the various elements of embodiment 1300 and that other point-to-point interconnection options (e.g. non-bus architecture) are also feasible.

User interface and display 1310 is driven by interface circuit 1315. The user interface and display 1310 is used as a multimedia interface having both audio and video capability to display streamed or downloaded audio and/or video and/or multimedia content obtained via communications interfaces 1325 and connections 1305 to a network. Multiple communication interfaces and multiple IP connections may be required.

Tuner 1355 requests and receives downloaded and/or streamed audio, video and multimedia content over bus 1350 through communication interface 1325 from network 1305. Tuner 1355 includes not only a tuner (e.g., satellite receiver) but also a demodulator and other features relevant for the purpose of the proposed method, such as packet error detector and other RF signal reception parameters, such as carrier level, carrier to noise ratio (CNR), bit-error rate, received frequency, polarity and band (for satellite), packet count etc. As indicated above with respect to at least FIGS. 9, 10 and 12, multiple tuners or multiple IP connections may be required. Thus, tuner 1355 may be interpreted as multiple tuners when and where necessary to support the operation of the proposed method and apparatus with secondary video content, where secondary video content may include multiple additional video content for a "video wall". It should also be noted that multiple tuners are necessary when the video content is received from cable, satellite and/or conventional broadcast content providers. However, any content received via IPTV does not require a tuner but only a WiFi or Ethernet connection (such as communications interface 1325) is required for such IPTV content.

Any or all of the functionality included in the set top box or digital TV may be embodied as application specific integrated circuits (ASICs), field programmable gate arrays (FPGAs), reduced instruction set computers (RISCs) or any other equivalent separate type of co-processor integrated into processor 620.

Memory 1345 (such as RAM) can act as a repository for memory related to any of the methods that incorporate the functionality of the set top box. Memory 1345 can provide the repository for storage of information such as program memory, downloads, uploads, or scratchpad calculations as well as the storage of streamed or downloaded content including audio, video and multimedia content. Those of skill in the art will recognize that memory 1345 may be incorporated all or in part of processor 1320. Communication interface 1325 has both receiver and transmitter elements for communication as known to those of skill in the art. Program instructions for operation of the processor of the set top box may be in memory 1345 or may be in processor.

Storage 1346 (such as a hard disk or flash memory) may also be present. RAM memory such as memory 1345 cannot store data after an outage occurs so memory 1346 may also be present in the proposed apparatus in order to support operation of the proposed method should an outage occur.

Figure 14:
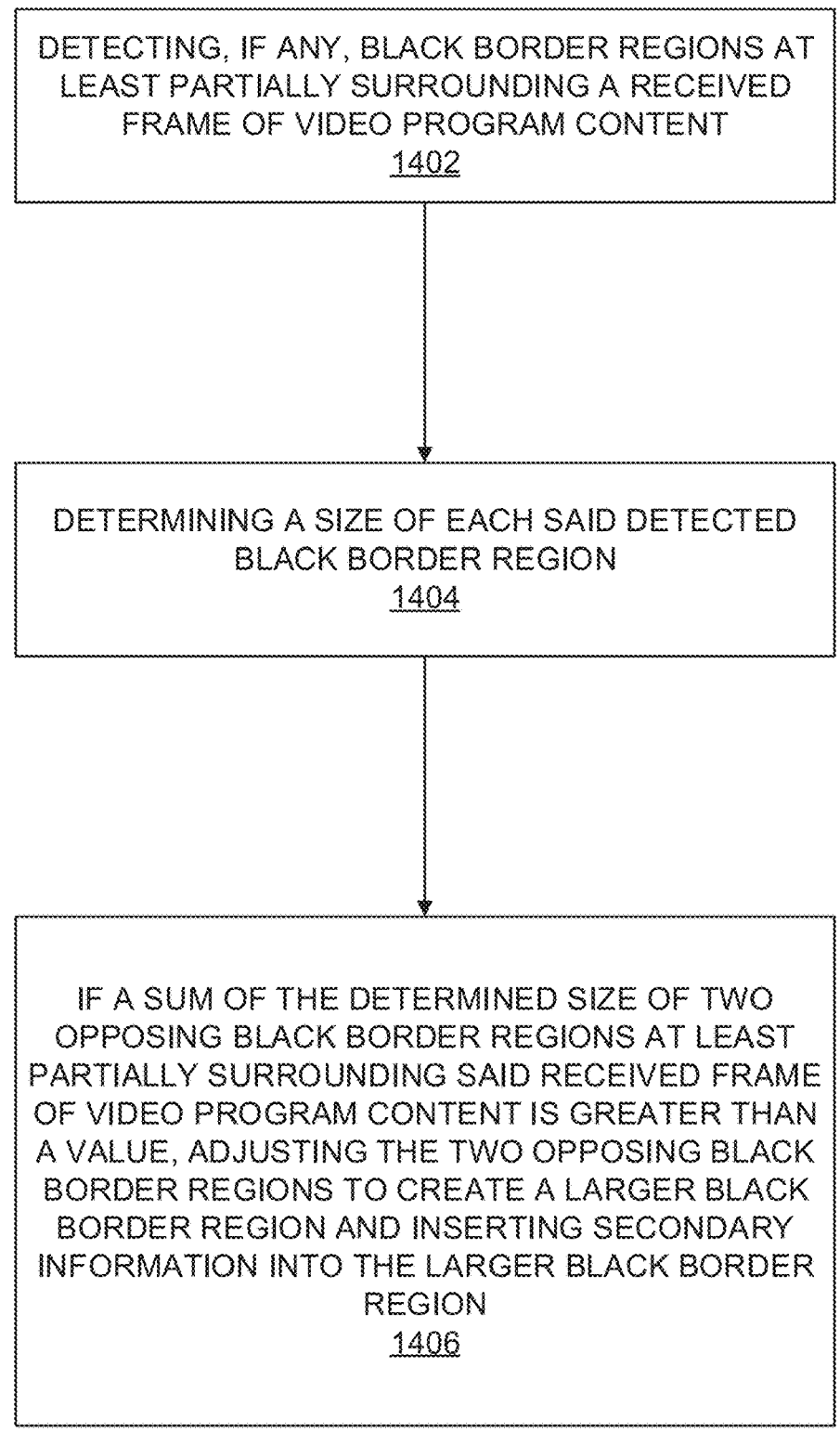
FIG. 14 is a flowchart illustrating an example process for handling a black border region according to some embodiments.

FIG. 14 is a flowchart illustrating an example process 1400 for handling a black border region. The example process 1400 may include detecting 1402, if any, black border regions at least partially surrounding a received frame of video program content. The example process 1400 may further include determining 1404 a size of each said detected black border region. The example process 1400 may further include if a sum of the determined size of two opposing black border regions at least partially surrounding said received frame of video program content is greater than a value, adjusting 1406 the two opposing black border regions to create a larger black border region and inserting secondary information into the larger black border region.

Figure 15:
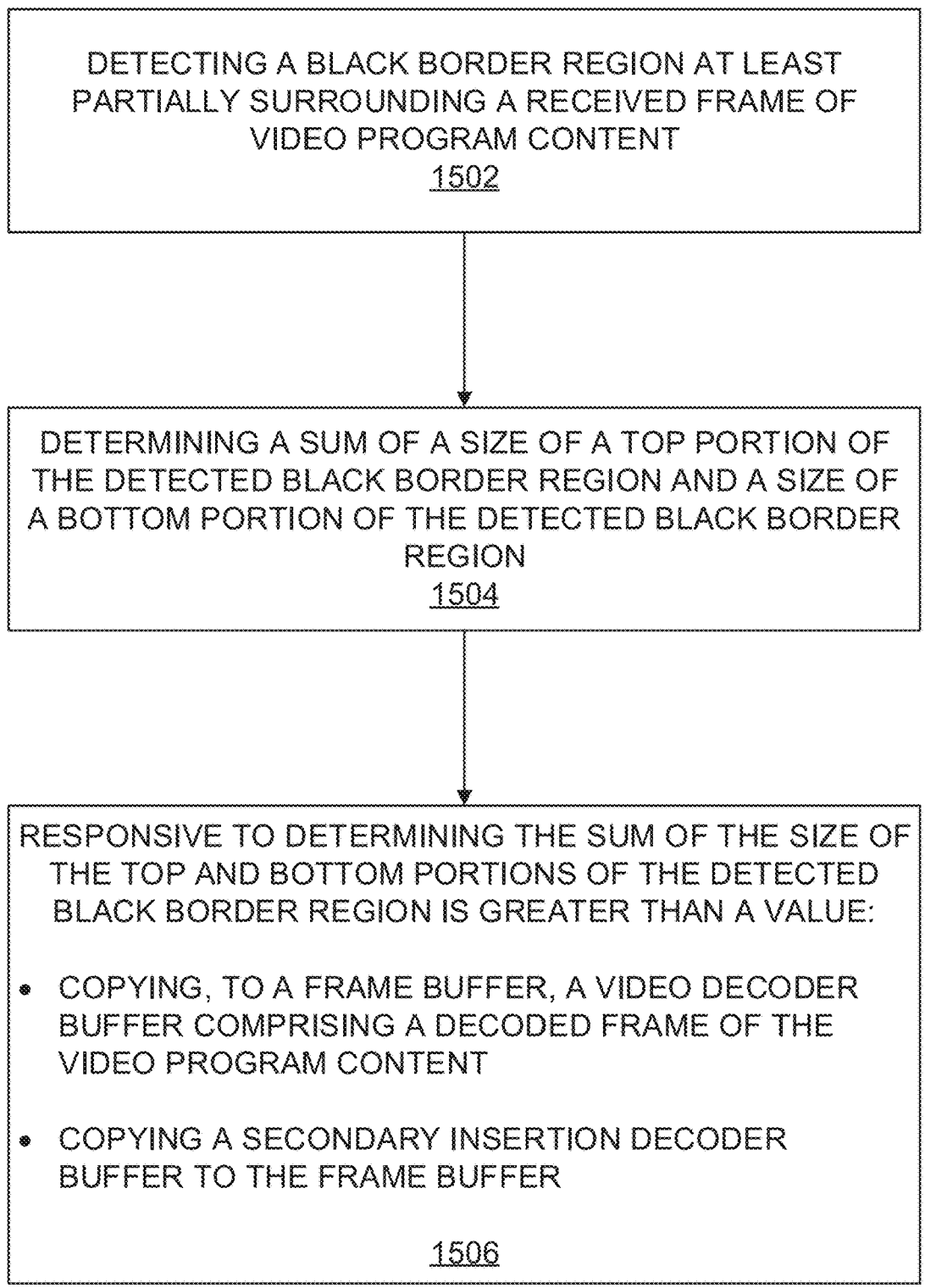
FIG. 15 is a flowchart illustrating an example process for handling a black border region according to some embodiments.

FIG. 15 is a flowchart illustrating an example process 1500 for handling a black border region. The example process 1500 may include detecting 1502 a black border region at least partially surrounding a received frame of video program content. The example process 1500 may further include determining 1504 a sum of a size of a top portion of the detected black border region and a size of a bottom portion of the detected black border region. The example process 1500 may further include responsive to determining 1506 the sum of the size of the top and bottom portions of the detected black border region is greater than a value: copying, to a frame buffer, a video decoder buffer comprising a decoded frame of the video program content; and copying a secondary insertion decoder buffer to the frame buffer.

FIG. 16 is a flowchart illustrating an example process 1600 for handling a black border region. The example process 1600 may include detecting 1602, if any, black border regions at least partially surrounding a received frame of video program content. The example process 1600 may further include determining 1604 a size of each said detected black border region. The example process 1600 may further include if a sum of the determined size of two opposing black border regions at least partially surrounding said received frame of video program content is greater than a value, adjusting 1606 the two opposing black border regions to create a larger black border region and inserting secondary information into the larger black border region. In accordance with the example process 1600, adjusting 1606 the two opposing black border regions to create a larger black border region and inserting secondary information into the larger black border region may include: copying to a frame buffer, a video decoder buffer having a decoded frame of video program content stored therein; and copying a secondary insertion decoder buffer having the secondary information to said frame buffer.

It is to be understood that the proposed method and apparatus may be implemented in various forms of hardware, software, firmware, special purpose processors, or a combination thereof. Special purpose processors may include application specific integrated circuits (ASICs), reduced instruction set computers (RISCs) and/or field programmable gate arrays (FPGAs). Preferably, the proposed method and apparatus is implemented as a combination of hardware and software. Moreover, the software is preferably implemented as an application program tangibly embodied on a program storage device. The application program may be uploaded to, and executed by, a machine comprising any suitable architecture. Preferably, the machine is implemented on a computer platform having hardware such as one or more central processing units (CPU), a random access memory (RAM), and input/output (I/O) interface(s). The computer platform also includes an operating system and microinstruction code. The various processes and functions described herein may either be part of the microinstruction code or part of the application program (or a combination thereof), which is executed via the operating system. In addition, various other peripheral devices may be connected to the computer platform such as an additional data storage device and a printing device.

It should be understood that the elements shown in the figures may be implemented in various forms of hardware, software or combinations thereof. Preferably, these elements are implemented in a combination of hardware and software on one or more appropriately programmed general-purpose devices, which may include a processor, memory and input/output interfaces. Herein, the phrase "coupled" is defined to mean directly connected to or indirectly connected with through one or more intermediate components. Such intermediate components may include both hardware and software based components.

It is to be further understood that, because some of the constituent system components and method steps depicted in the accompanying figures are preferably implemented in software, the actual connections between the system components (or the process steps) may differ depending upon the manner in which the proposed method and apparatus is programmed. Given the teachings herein, one of ordinary skill in the related art will be able to contemplate these and similar implementations or configurations of the proposed method and apparatus.

For purposes of this application and the claims, using the exemplary phrase "at least one of A, B and C," the phrase means "only A, or only B, or only C, or any combination of A, B and C."

What is claimed:

1. A method, said method comprising:
   detecting, if any, black border regions at least partially surrounding a received frame of video program content;
   determining a size of each said detected black border region; and
   if a sum of the determined size of two opposing black border regions at least partially surrounding said received frame of video program content is greater than a value, adjusting the two opposing black border regions to create a larger black border region and inserting secondary information into the larger black border region.

2. The method according to claim 1, further comprising rendering the video program content and the larger black border region with the inserted secondary information on a display.

3. The method according to claim 1, wherein said determining said size of said detected black border regions at least partially surrounding said received frame of video program content further comprises:
   analyzing black frame edge positions according to a Y luminance information matrix to determine said black border regions of said received frame of video program content;
   setting a black level luminance threshold; and
   determining whether the black border regions of said received frame of video program content are sufficient for information insertion.

4. The method according to claim 3, wherein said determining said size of said detected black border regions at least partially surrounding said received frame of video program content further comprises, prior to analyzing said black frame edge positions:
   reading resolution information of said received frame of video program content;
   reading pixel information of digital television output;
   converting said pixel information into YUV image space;
   caching a Y luminance information matrix; and
   reading resolution information of said digital television output.

5. The method according to claim 1, wherein further comprising receiving video program content of said received frame from one of a cable provider, a satellite provider, a broadcast provider, or an IPTV provider.

6. The method according to claim 5, wherein receiving the video program content comprises using a tuner to receive the video program content of said received frame from one of said cable provider, said satellite provider, or said broadcast provider and using an IP connection to receive the video program content of said received frame from the IPTV provider.

7. The method according to claim 1, wherein said secondary information comprises one of secondary video content, advertisements, information and alerts.

8. The method according to claim 7,
   wherein the secondary information comprises secondary video content, and
   wherein the method further comprises receiving said secondary video content from one or more of a cable provider, a satellite provider, a broadcast provider, and an IPTV provider.

9. The method according to claim 8, wherein receiving said secondary video content comprises using a tuner to receive each unit of the secondary video content from one of said cable provider, said satellite provider, or said broadcast provider and using an IP connection to receive each unit of said secondary video content from the IPTV provider.

10. The method of claim 1, wherein the size comprises area.

11. The method of claim 1, wherein the size comprises at least one of area and height.

12. The method of claim 1, wherein the value comprises a predefined number of pixels.

13. The method according to claim 1, wherein adjusting the two opposing black border regions to create a larger black border region and inserting secondary information into the larger black border region comprises:
   copying to a frame buffer, a video decoder buffer having a decoded frame of video program content stored therein; and
   copying a secondary insertion decoder buffer having the secondary information to said frame buffer.

14. The method according to claim 1, wherein adjusting the two opposing black border regions to create a larger black border region and inserting secondary information into the larger black border region comprises relocating the video program content to create the larger black border region.

15. The method of claim 1, wherein the two opposing black border regions comprise the top and bottom black border regions.

16. The method of claim 1, wherein the two opposing black border regions comprise the left and right black border regions.

17. An apparatus, comprising:
   a processor, said processor configured to:
      detect, if any, black border regions at least partially surrounding a received frame of video program content;
      determine a size of each said detected black border region; and
      if a sum of the determined size of two opposing black border regions at least partially surrounding said received frame of video program content is greater than a value, adjust the two opposing black border regions to create a larger black border region and inserting secondary video content into the larger black border region.

18. The apparatus according to claim 17, further comprising:
   a user interface; and
   a display configured to render the video program content and the larger black border region with the inserted secondary information on the display.

19. The apparatus according to claim 17, wherein determining said size of said detected black border regions at least partially surrounding said received frame of video program content further comprises:
   analyze black frame edge positions according to a Y luminance information matrix to determine said black border regions of said received frame of video program content;
   set a black level luminance threshold; and
   determine whether the black border regions of said received frame of video program content are sufficient for information insertion.

20. The apparatus according to claim 19, wherein said determining said size of said detected black border regions at least partially surrounding said received frame of video program content further comprises, prior to analyzing said black frame edge positions:
   reading resolution information of said received frame of video program content;

reading pixel information of digital television output;
converting said pixel information into YUV image space;
caching a Y luminance information matrix; and
reading resolution information of said digital television output.

21. The apparatus according to claim 17,
further comprising at least one of a tuner and an IP connection,
wherein video program content of said received frame is received from one of a cable provider, a satellite provider, a broadcast provider, or an IPTV provider,
wherein the tuner is configured to receive the video program content of said received frame from one of said cable provider, said satellite provider, or said broadcast provider, and
wherein the IP connection is configured to receive video program content from the IPTV provider.

22. The apparatus according to claim 17, wherein said secondary information comprises one of secondary video content, advertisements, information and alerts.

23. A method comprising:
detecting a black border region at least partially surrounding a received frame of video program content;
determining a sum of a size of a top portion of the detected black border region and a size of a bottom portion of the detected black border region; and
responsive to determining the sum of the size of the top and bottom portions of the detected black border region is greater than a value:
copying, to a frame buffer, a video decoder buffer comprising a decoded frame of the video program content; and
copying a secondary insertion decoder buffer to the frame buffer.

24. The method of claim 23, wherein determining the sum of the size of the top portion of the detected black border region and the size of the bottom portion of the detected black border region comprises:
obtaining a matrix of luminance information corresponding to the received frame of video content;
determining one or more edges of the black border region corresponding to locations in the matrix of luminance information indicating a black level luminance exceeding a black level luminance threshold;
determining the size of the top portion of the black border region using the edge positions of the black border region;
determining the size of the bottom portion of the black border region using the edge positions of the black border region; and
summing the size of the top and bottom portions of the detected black border region.

25. The method of claim 23, wherein determining the sum of the size of the top portion of the detected black border region and the size of the bottom portion of the detected black border region comprises:
obtaining a matrix of luminance values corresponding to the received frame of video program content;
determining one or more edges of the black border region of the received frame of the video program content by comparing the matrix of luminance values with a black level luminance threshold;
determining the sizes of the top and bottom portions of the black border region using the one or more edges of the black border region; and
summing the size of the top and bottom portions of the detected black border region.

26. The method of claim 23,
wherein determining the sum of the size of the top portion of the detected black border region and the size of the bottom portion of the detected black border region comprises determining the size of at least one of the top portion and the bottom portion of the detected black border region, and
wherein determining the size of at least one of the top portion and the bottom portion of the detected black border region comprises using a matrix of luminance values corresponding to the received frame of video content.

27. The method of claim 23, wherein detecting the black border region comprises using a matrix of luminance values corresponding to the received frame of video content.

* * * * *